(12) United States Patent
Zhong et al.

(10) Patent No.: US 12,168,197 B2
(45) Date of Patent: Dec. 17, 2024

(54) CO2 SCRUBBER WITH MOVING BED STRUCTURE

(71) Applicant: Carrier Corporation, Palm Beach Gardens, FL (US)

(72) Inventors: Zhipeng Zhong, Shanghai (CN); Catherine Thibaud, Cork (IE)

(73) Assignee: CARRIER CORPORATION, Palm Beach Gardens, FL (US)

( * ) Notice: Subject to any disclaimer, the term of this patent is extended or adjusted under 35 U.S.C. 154(b) by 719 days.

(21) Appl. No.: 17/057,279

(22) PCT Filed: Aug. 27, 2019

(86) PCT No.: PCT/US2019/048244
§ 371 (c)(1),
(2) Date: Nov. 20, 2020

(87) PCT Pub. No.: WO2020/046864
PCT Pub. Date: Mar. 5, 2020

(65) Prior Publication Data
US 2021/0252451 A1    Aug. 19, 2021

(30) Foreign Application Priority Data
Aug. 30, 2018    (CN) .......................... 201811006971.1

(51) Int. Cl.
*B01D 53/08*    (2006.01)
*F24F 8/158*    (2021.01)

(52) U.S. Cl.
CPC .............. *B01D 53/08* (2013.01); *F24F 8/158* (2021.01); *B01D 2253/102* (2013.01);
(Continued)

(58) Field of Classification Search
CPC .............. B01D 53/08; B01D 2253/102; B01D 2257/504; B01D 2257/80; B01D 2258/06;
(Continued)

(56) References Cited

U.S. PATENT DOCUMENTS 2,286,920 A * 6/1942 Miller .................. F24F 3/1423
96/125
2,639,000 A * 5/1953 Edwards ................ B01D 53/06
210/392
(Continued)

FOREIGN PATENT DOCUMENTS

| CN | 1213588 A | * | 4/1999 | ......... B01D 53/9454 |
| CN | 1293556 A | * | 5/2001 | ....... A61F 13/15617 |

(Continued)

OTHER PUBLICATIONS

International Search Report for International Application No. PCT/US2019/048244, International Filing Date: Aug. 27, 2019, Date of Mailing: Dec. 13, 2019, 5 pages.
(Continued)

*Primary Examiner* — Stephen Hobson
(74) *Attorney, Agent, or Firm* — CANTOR COLBURN LLP

(57) ABSTRACT

A carbon dioxide scrubber includes an adsorption chamber through which an adsorption airflow is directed, a regeneration chamber through which a regeneration airflow is directed, and a divider wall separating the adsorption chamber from the regeneration chamber. A carbon dioxide sorbent bed extends across the adsorption chamber and the regeneration chamber. The carbon dioxide sorbent bed is configured to adsorb carbon dioxide from the adsorption airflow into the sorbent bed and exhaust carbon dioxide from the carbon dioxide sorbent bed into the regeneration airflow. The carbon dioxide sorbent bed is continuously movable
(Continued)

through the adsorption chamber and the regeneration chamber.

13 Claims, 8 Drawing Sheets

(52) U.S. Cl.
CPC .... *B01D 2257/504* (2013.01); *B01D 2257/80* (2013.01); *B01D 2258/06* (2013.01); *B01D 2259/40084* (2013.01); *B01D 2259/40088* (2013.01); *B01D 2259/4508* (2013.01)

(58) Field of Classification Search
CPC ........... B01D 2259/40084; B01D 2259/40088; B01D 2259/4508; B01D 2253/108; B01D 2253/1124; B01D 2253/116; B01D 2253/202; B01D 2253/204; B01D 2253/25; B01D 2257/704; B01D 2257/708; B01D 53/06; B01D 2259/4009; F24F 8/158; Y02C 20/40
See application file for complete search history.

(56) References Cited

U.S. PATENT DOCUMENTS

| | | | | |
|---|---|---|---|---|
| 3,009,540 A * | 11/1961 | Munters | F24F 3/1423 95/123 |
| 3,009,684 A * | 11/1961 | Munters | F24F 3/1423 96/299 |
| 3,470,708 A * | 10/1969 | Weil | F24F 3/1423 62/271 |
| 3,780,498 A * | 12/1973 | Wenner | B01D 53/06 95/137 |
| 3,865,924 A * | 2/1975 | Gidaspow | H01M 8/0662 423/232 |
| 3,883,326 A * | 5/1975 | Wenner | B01D 53/508 95/137 |
| 4,180,985 A * | 1/1980 | Northrup, Jr. | F24F 5/001 62/271 |
| 4,391,616 A * | 7/1983 | Imamura | B01J 20/20 95/92 |
| 4,398,927 A * | 8/1983 | Asher | F24F 3/1423 95/123 |
| 4,409,006 A * | 10/1983 | Mattia | B01D 53/06 95/113 |
| 4,701,189 A * | 10/1987 | Oliker | B01D 53/06 95/123 |
| 4,926,618 A * | 5/1990 | Ratliff | F24F 3/1423 96/111 |
| 4,948,392 A * | 8/1990 | Rush | B01D 53/261 95/123 |
| 5,057,128 A * | 10/1991 | Panzica | B01D 53/0415 96/123 |
| 5,133,784 A * | 7/1992 | Boudet | B01D 53/06 95/100 |
| 5,158,582 A * | 10/1992 | Onitsuka | B01D 53/9481 95/122 |
| 5,167,679 A * | 12/1992 | Maekawa | B01D 53/06 96/144 |
| 5,169,414 A * | 12/1992 | Panzica | F24F 3/1423 96/125 |
| 5,170,633 A * | 12/1992 | Kaplan | F24F 3/1423 62/271 |
| 5,464,468 A * | 11/1995 | Tanaka | B01D 53/06 96/144 |
| 5,512,083 A * | 4/1996 | Dunne | B01D 53/06 95/143 |
| 5,628,819 A * | 5/1997 | Mestemaker | B01J 20/28045 96/123 |
| 5,702,508 A * | 12/1997 | Moratalla | B01D 53/06 96/140 |
| 5,810,895 A * | 9/1998 | Staehle | B01D 46/36 55/400 |
| 5,817,167 A * | 10/1998 | DesChamps | B01D 53/06 95/114 |
| 6,099,608 A * | 8/2000 | Harms | F24F 8/158 55/471 |
| 6,500,236 B2 * | 12/2002 | Suzuki | B01D 53/06 95/139 |
| 6,521,026 B1 * | 2/2003 | Goto | B01D 53/06 96/125 |
| 6,527,837 B2 * | 3/2003 | Kurosawa | F24F 3/1423 55/502 |
| 6,780,227 B2 * | 8/2004 | DuBose | H01M 8/0662 96/125 |
| 6,783,738 B1 * | 8/2004 | Sasaki | B01D 53/62 422/177 |
| 7,166,149 B2 * | 1/2007 | Dunne | B01D 53/261 96/123 |
| 8,052,783 B2 * | 11/2011 | Baker | B01D 53/06 96/125 |
| 8,500,886 B2 * | 8/2013 | Okano | B01D 53/06 96/123 |
| 8,551,230 B2 * | 10/2013 | Caggiano | B01D 53/002 96/125 |
| 8,715,393 B2 * | 5/2014 | Wright | B01D 53/04 96/111 |
| 8,747,531 B2 * | 6/2014 | Dinnage | B01D 53/263 96/144 |
| 8,900,347 B2 * | 12/2014 | Boulet | C10L 3/102 95/114 |
| 8,974,576 B2 * | 3/2015 | Gupta | B01D 53/0462 95/139 |
| 9,341,408 B2 * | 5/2016 | Fleming, Jr | A23L 3/3418 |
| 9,403,116 B2 * | 8/2016 | Fleming, Jr. | A23B 7/148 |
| 9,566,545 B2 | 2/2017 | Meirav et al. | |
| 9,757,679 B2 * | 9/2017 | Monereau | B01J 20/2804 |
| 9,841,242 B2 * | 12/2017 | Zhang | F28D 19/041 |
| 9,925,488 B2 * | 3/2018 | Eisenberger | B01D 53/06 |
| 9,950,290 B2 * | 4/2018 | Meirav | B01D 53/0438 |
| 9,987,584 B2 * | 6/2018 | Meirav | B01D 53/0454 |
| 10,563,555 B2 * | 2/2020 | Hamad | B01J 20/28035 |
| 10,702,825 B2 * | 7/2020 | Jin | F24F 3/1423 |
| 10,799,828 B2 * | 10/2020 | Postgate | F16C 33/80 |
| 2001/0009124 A1 * | 7/2001 | Suzuki | B01D 53/06 95/139 |
| 2002/0134246 A1 * | 9/2002 | Babicki | B01D 53/0476 96/125 |
| 2005/0229562 A1 * | 10/2005 | Dallas | B01D 46/62 55/467 |
| 2005/0252229 A1 * | 11/2005 | Moratalla | B01D 53/26 62/271 |
| 2006/0081348 A1 * | 4/2006 | Graef | A61F 13/5323 604/385.01 |
| 2008/0230199 A1 * | 9/2008 | Harwood | D21F 7/10 162/358.2 |
| 2011/0113957 A1 * | 5/2011 | Sceats | B01D 53/346 96/112 |
| 2012/0000365 A1 * | 1/2012 | Okano | B01D 53/261 96/144 |
| 2012/0152116 A1 * | 6/2012 | Barclay | B01D 53/06 96/144 |
| 2013/0058850 A1 * | 3/2013 | Oinuma | B01D 53/8675 204/157.3 |
| 2013/0095996 A1 * | 4/2013 | Buelow | B01J 20/3272 502/402 |
| 2013/0152787 A1 * | 6/2013 | Boulet | B01D 53/0462 95/91 |
| 2013/0178987 A1 * | 7/2013 | Meirav | G05B 15/02 700/276 |
| 2014/0134553 A1 * | 5/2014 | Ghoniem | F23C 99/00 431/170 |
| 2015/0053087 A1 * | 2/2015 | Postgate | F16J 15/022 96/144 |
| 2015/0298050 A1 * | 10/2015 | Richardson | A23B 7/144 96/144 |

(56) References Cited

U.S. PATENT DOCUMENTS

| | | | | |
|---|---|---|---|---|
| 2015/0321135 A1* | 11/2015 | Meirav | ............ | B01D 53/0446 96/115 |
| 2015/0352518 A1* | 12/2015 | Meirav | ................... | B01J 20/08 502/401 |
| 2015/0375157 A1* | 12/2015 | Meirav | ................ | F24F 3/0442 96/108 |
| 2016/0228809 A1* | 8/2016 | Meirav | ............. | B01D 53/0462 |
| 2016/0363333 A1* | 12/2016 | Meirav | .................... | F24F 3/16 |
| 2017/0056812 A1* | 3/2017 | Meirav | ............. | B01D 53/0446 |
| 2017/0165602 A1* | 6/2017 | Postage | ................... | B65D 81/26 |
| 2019/0015767 A1* | 1/2019 | Fricker | ............. | B01D 46/0056 |
| 2020/0398214 A1* | 12/2020 | Lackner | ................. | B01D 53/08 |
| 2022/0266189 A1* | 8/2022 | Fricker | ............. | B01D 46/0056 |
| 2022/0387684 A1* | 12/2022 | Borillo | ................ | A61M 1/1607 |

FOREIGN PATENT DOCUMENTS

| | | | | |
|---|---|---|---|---|
| CN | 200945453 Y | * | 9/2007 | |
| CN | 103732306 A | | 4/2014 | |
| CN | 106718057 A | * | 5/2017 | ............. A01G 18/20 |
| CN | 109132341 A | * | 1/2019 | ............ B65G 15/42 |
| CN | 115318044 A | * | 11/2022 | |
| EP | 2711642 A1 | | 3/2014 | |
| WO | WO-2010029724 A1 | * | 3/2010 | ........... B01D 53/261 |
| WO | 2012158911 A2 | | 11/2012 | |
| WO | WO-2013141891 A1 | * | 9/2013 | ............ A23B 7/148 |
| WO | 2014077942 A1 | | 5/2014 | |
| WO | 2015042150 A1 | | 3/2015 | |
| WO | 2016183237 A1 | | 11/2016 | |
| WO | 2017035254 A1 | | 3/2017 | |
| WO | 2017139555 A1 | | 8/2017 | |
| WO | 2017184780 A1 | | 10/2017 | |
| WO | WO-2018200727 A1 | * | 11/2018 | ........... B01D 46/002 |
| WO | WO-2019165151 A1 | * | 8/2019 | ............. B01D 53/04 |
| WO | WO-2022096568 A2 | * | 5/2022 | ......... B01D 53/0462 |
| WO | WO-2022147560 A1 | * | 7/2022 | ............. B01D 53/06 |

OTHER PUBLICATIONS

Written Opinion for International Application No. PCT/2019/048244, International Filing Date: Aug. 27, 2019, Date of Mailing: Dec. 13, 2019, 9 pages.

* cited by examiner

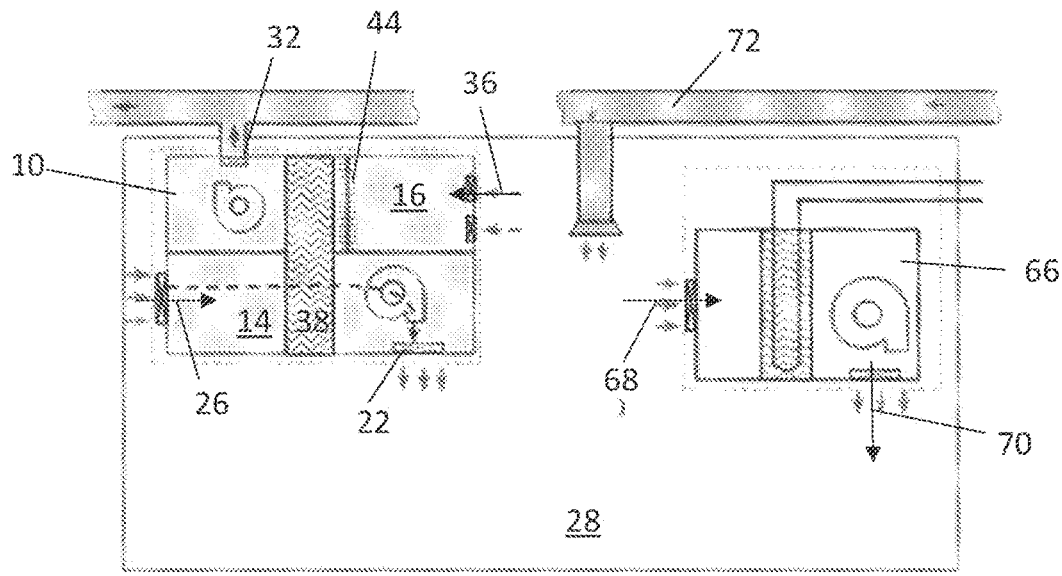
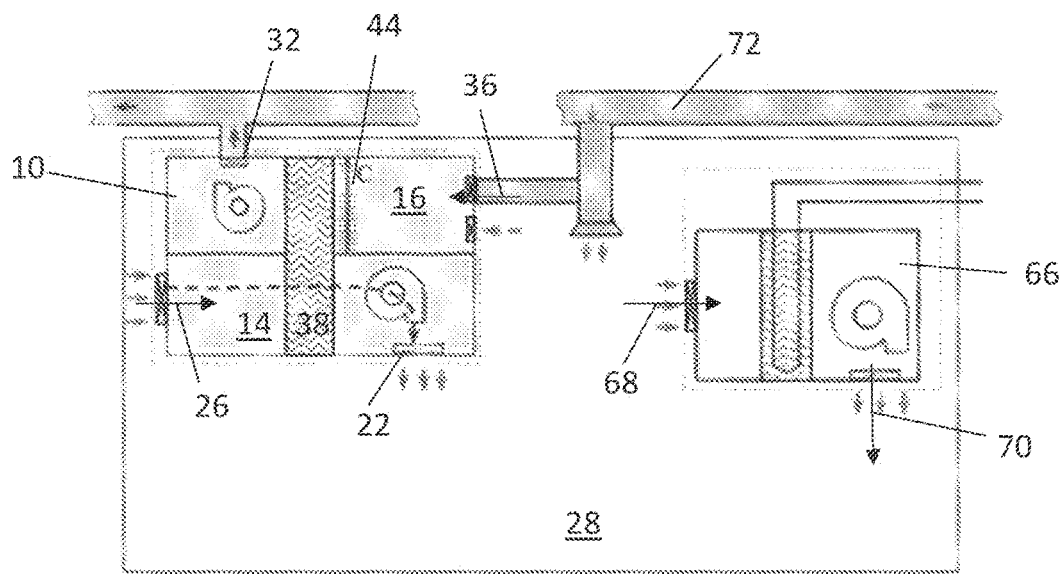

CO2 SCRUBBER WITH MOVING BED STRUCTURE

CROSS REFERENCE TO RELATED APPLICATIONS

This application is a National Stage application of PCT/US2019/048244, filed Aug. 27, 2019, which claims the benefit of Chinese Application No. 201811006971.1 filed Aug. 30, 2018, the disclosures of which are incorporated herein by reference in their entirety.

BACKGROUND

Exemplary embodiments pertain to the art of indoor air quality management, and in particular to mitigation of carbon dioxide ($CO_2$) accumulation in a building or other structure.

A certain amount of outside air (so called "fresh air") is mandated to be supplied to an indoor conditioned space so as to dilute indoor generated gases caused by human occupancy, furniture offgassing or equipment operation (such as printers). Such gases typically include $CO_2$, formaldehyde (HCHO), volatile organic compounds (VOCs), etc. Introduction of the outside air is used to maintain acceptable indoor air quality (IAQ) for ventilation code compliance. Consequently, a significant amount of energy is consumed for heating, cooling and/or dehumidification of the outside air before it is introduced into the conditioned space. Further, in many locations, the outside air quality is poor, and includes particulates, ozone, nitrogen and sulfur oxides (NOx, Sox), and other pollutants undesirable to be introduced into the conditioned space.

In certain conditions, it may be desired to reduce the introduction of outside air, such as when the outside air is cold, hot, humid, or when the outside air is polluted. With less outside air ventilation, less energy is consumed to heat, cool or dehumidify the outside air, and outside air pollutant introduction is reduced. Decrease of ventilation air may cause the $CO_2$ inside the space to increase and therefore a $CO_2$ removal system ($CO_2$ scrubber) may be required to remove $CO_2$ from the inside air.

Some fixed bed cartridge $CO_2$ scrubbers exist in the market, which feature one or two sorbent beds. The airflow to be treated passes through the cartridge for $CO_2$ adsorption mode until the $CO_2$ sorbent is saturated. Then the scrubber will switch to a regeneration purge mode through a damper switch operation. A 2 bed system enables a continuous performance as one bed adsorbs (until its capacity is reached) as the other desorbs. However, such systems require complex valving systems for operation.

BRIEF DESCRIPTION

In one embodiment, a carbon dioxide scrubber includes an adsorption chamber through which an adsorption airflow is directed, a regeneration chamber through which a regeneration airflow is directed, and a divider wall separating the adsorption chamber from the regeneration chamber. A carbon dioxide sorbent bed extends across the adsorption chamber and the regeneration chamber. The carbon dioxide sorbent bed is configured to adsorb carbon dioxide from the adsorption airflow into the sorbent bed and exhaust carbon dioxide from the carbon dioxide sorbent bed into the regeneration airflow. The carbon dioxide sorbent bed is continuously movable through the adsorption chamber and the regeneration chamber.

Additionally or alternatively, in this or other embodiments a heater located in the regeneration chamber is configured to heat the regeneration airflow.

Additionally or alternatively, in this or other embodiments the carbon dioxide sorbent bed is a carbon dioxide sorbent wheel rotatable about a central axis.

Additionally or alternatively, in this or other embodiments the carbon dioxide sorbent bed is a belt extending about a first drive wheel located in the adsorption chamber and a second drive wheel located in the regeneration chamber. The carbon dioxide sorbent bed is circulated between the adsorption chamber and the regeneration chamber by rotation of the first drive wheel and the second drive wheel.

Additionally or alternatively, in this or other embodiments the carbon dioxide sorbent bed is a corrugated belt.

Additionally or alternatively, in this or other embodiments a recirculation chamber us configured to recirculate the regeneration airflow through the regeneration chamber.

Additionally or alternatively, in this or other embodiments the carbon dioxide sorbent bed includes one or more of activated carbon, carbon fiber, zeolite, molecular sieve, polymer fibers, metal organic framework (MOF), a metal oxide or amine or amine functionality containing material supported by at least one of porous material such as silica, carbon, clay or metal oxide in granular or pelleted shape solids or fiber form.

Additionally or alternatively, in this or other embodiments a secondary sorbent bed extends across the adsorption chamber and the regeneration chamber. The secondary sorbent bed is configured to adsorb a secondary material from the adsorption airflow into the sorbent bed and exhaust the secondary material from the secondary sorbent bed into the regeneration airflow. The secondary sorbent bed is continuously movable through the adsorption chamber and the regeneration chamber.

Additionally or alternatively, in this or other embodiments the secondary sorbent bed is a belt extending between the adsorption chamber and the regeneration chamber.

Additionally or alternatively, in this or other embodiments the secondary sorbent bed is configured to adsorb one or more of H2O, HCHO or volatile organic compounds from the adsorption airflow.

Additionally or alternatively, in this or other embodiments a heat exchanger is configured to recover thermal energy from an exhaust portion of the regeneration airflow downstream of the regeneration chamber.

Additionally or alternatively, in this or other embodiments the heat exchanger is configured to transfer the recovered thermal energy to an inlet portion of the regeneration airflow upstream of the regeneration chamber.

Additionally or alternatively, in this or other embodiments the heat exchanger is one of a heat recovery ventilation heat exchanger or a direct expansion heat pump.

In another embodiment, an air handling unit including a housing, a return air damper through which a return airflow is directed into the air handling unit, a supply air damper through which a supply airflow is directed from the air handling unit into a conditioned space, and one or more of a heating coil and a cooling coil located in the housing configured to alter a temperature of the return airflow in the housing. A carbon dioxide scrubber is operably connected to the air handling unit. The carbon dioxide scrubber includes an adsorption chamber through which an adsorption airflow is directed, a regeneration chamber through which a regeneration airflow is directed, a divider wall separating the adsorption chamber from the regeneration chamber, and a carbon dioxide sorbent bed configured extending across the adsorption chamber and the regeneration chamber. The carbon dioxide sorbent bed is configured to adsorb carbon dioxide from the adsorption airflow into the sorbent bed and exhaust carbon dioxide from the carbon dioxide sorbent bed into the regeneration airflow. The carbon dioxide sorbent bed is continuously movable through the adsorption chamber and the regeneration chamber. The adsorption airflow is directed from the housing into the adsorption chamber and returned from the adsorption chamber into the housing.

Additionally or alternatively, in this or other embodiments the adsorption airflow is directed into the adsorption chamber from downstream of the cooling coil and is returned into the housing upstream of the heating coil.

Additionally or alternatively, in this or other embodiments the regeneration airflow is directed into the regeneration chamber from the housing at a location downstream of the heating coil of the air handling unit.

Additionally or alternatively, in this or other embodiments the cooling coil is an evaporator of a vapor compression cycle, and the heating coil is powered by a furnace.

Additionally or alternatively, in this or other embodiments the regeneration airflow is directed across a condenser of the vapor compression cycle prior to entering the regeneration chamber.

In yet another embodiment, a heating, ventilation and air conditioning and carbon dioxide scrubbing system includes a terminal heating, ventilation and air conditioning (HVAC) system disposed at a conditioned space, the terminal HVAC system configured to condition a return airflow and supply the airflow to the conditioned space. A carbon dioxide scrubber is operably connected to the air handling unit. The carbon dioxide scrubber includes an adsorption chamber through which an adsorption airflow is directed, a regeneration chamber through which a regeneration airflow is directed, a divider wall separating the adsorption chamber from the regeneration chamber, and a carbon dioxide sorbent bed extending across the adsorption chamber and the regeneration chamber. The carbon dioxide sorbent bed is configured to adsorb carbon dioxide from the adsorption airflow into the sorbent bed and exhaust carbon dioxide from the carbon dioxide sorbent bed into the regeneration airflow. The carbon dioxide sorbent bed is continuously movable through the adsorption chamber and the regeneration chamber. The adsorption airflow is directed from the conditioned space into the absorption chamber and returned from the adsorption chamber into the conditioned space.

Additionally or alternatively, in this or other embodiments a direct outside air system is configured to direct a flow of outside air into the conditioned space. The regeneration airflow is directed into the regeneration chamber from the direct outside air system, and the regeneration airflow is directed from the regeneration chamber to ambient.

BRIEF DESCRIPTION OF THE DRAWINGS

The following descriptions should not be considered limiting in any way. With reference to the accompanying drawings, like elements are numbered alike:

FIG. 7 is a schematic view of an embodiment of a terminal HVAC system including a $CO_2$ scrubber;

FIG. 8 is a schematic view of another embodiment of a terminal HVAC system including a $CO_2$ scrubber;

DETAILED DESCRIPTION

A detailed description of one or more embodiments of the disclosed apparatus and method are presented herein by way of exemplification and not limitation with reference to the figures.

Figure 1:
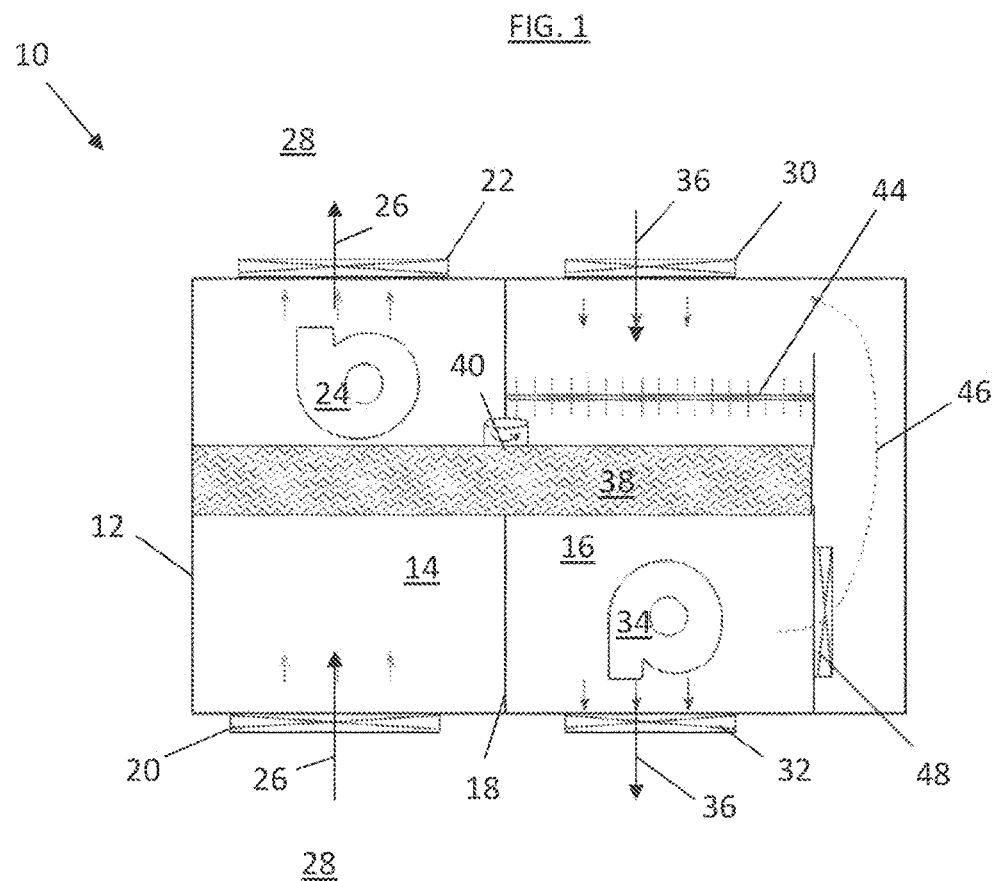
FIG. 1 is a schematic view of an embodiment of a $CO_2$ scrubber.

An embodiment of a carbon dioxide ($CO_2$) scrubber 10 is shown in FIG. 1. The $CO_2$ scrubber 10 includes a scrubber housing 12 having an adsorption chamber 14 and a regeneration chamber 16, separated by a divider wall 18. The adsorption chamber 14 includes an adsorption inlet damper 20 and an adsorption outlet damper 22. In some embodiments, an adsorption chamber fan 24 is located in the adsorption chamber 14 to urge an adsorption airflow 26 through the adsorption chamber 14. In some embodiments, the adsorption airflow 26 is an indoor airflow from a conditioned space 28 that is reintroduced to the conditioned space 28 after passing through the adsorption chamber 14.

Similarly, the regeneration chamber 16 includes a regeneration inlet damper 30 and a regeneration outlet damper 32. In some embodiments, a regeneration chamber fan 34 is located in the regeneration chamber 16 to urge a regeneration airflow 36 through the regeneration chamber 16. In some embodiments, the regeneration airflow 36 is an outside airflow that is exhausted to ambient after passing through the regeneration chamber 16. In some embodiments, a direction of flow of the adsorption airflow 26 through the adsorption chamber 14 is opposite to a direction of flow of the regeneration airflow 36 through the regeneration chamber 16.

Figure 2:
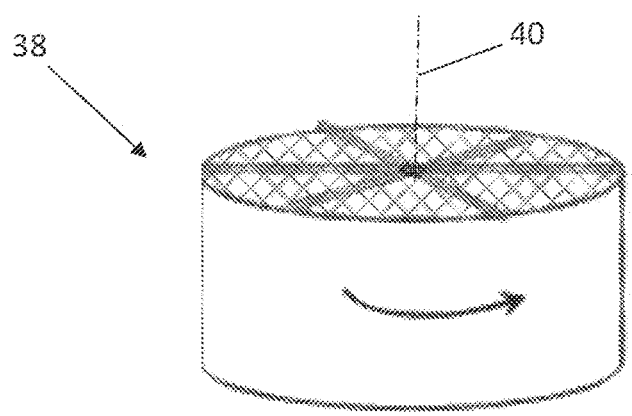
FIG. 2 is a schematic view of an embodiment of a sorbent bed of a $CO_2$ scrubber.

A moving sorbent bed 38 is located in the scrubber housing 12 and spans across the adsorption chamber 14 and the regeneration chamber 16, and through the divider wall 18. The sorbent bed 38 may be formed from, for example, an activated carbon material or a carbon material impregnated with amine materials, or other materials to adsorb $CO_2$ from the adsorption airflow 26. In some embodiments the sorbent bed 38 may include but is not limited to activated carbon, carbon fiber, zeolite, molecular sieve, polymer fibers, metal organic framework (MOF) and metal oxide known to react with $CO_2$ such as calcium, lithium and magnesium; and amine or amine functionality containing material supported by at least one of porous material such as silica, carbon, clay or metal oxide in granular or pelleted shape solids or fiber form. Additionally, the sorbent bed 38 may include materials to adsorb other materials in the adsorption airflow 26, such as HCHO or volatile organic compounds (VOCs). In the embodiment of FIG. 1, and as shown in FIG. 2, the moving sorbent bed 38 is a rotating wheel configuration with an axis of rotation 40 located at the divider wall 18. The sorbent bed 38 is operably connected to a power source (not shown) to drive rotation of the sorbent bed 38 about the axis of rotation 40. A heater 44 is located in the regeneration chamber 16 upstream of the sorbent bed 38. The heater 44 may be, for example, a radiative or microwave heater. Alternatively, waste heat may be used to regenerate the sorbent via an air flow heat exchanger or a heat conduction In operation of the $CO_2$ scrubber 10, the sorbent bed 38 continuously rotates about the axis of rotation 40. As the sorbent bed 38 rotates, the portion located in the adsorption chamber 14 adsorbs $CO_2$ from the adsorption airflow 26 flowing therethrough. The regeneration airflow 36 flowing into the regeneration chamber 16 via the regeneration inlet damper 30 is heated by the heater 44 and proceeds to the sorbent bed 38, where the sorbent bed 38 is regenerated by removal of the $CO_2$ from the sorbent bed 38 by the heated regeneration airflow 36, or heated directly by the heater 44 if it is radiative or microwave type heater. The regeneration airflow 36 is then exhausted to ambient through the regeneration outlet damper 32, and air ducts, if included.

In some embodiments, the $CO_2$ scrubber 10 includes a recirculation chamber 46 connected to the regeneration chamber 16 by a recirculation damper 48, which when opened, recirculates the regeneration airflow 36 through the regeneration chamber 16.

Figure 3:
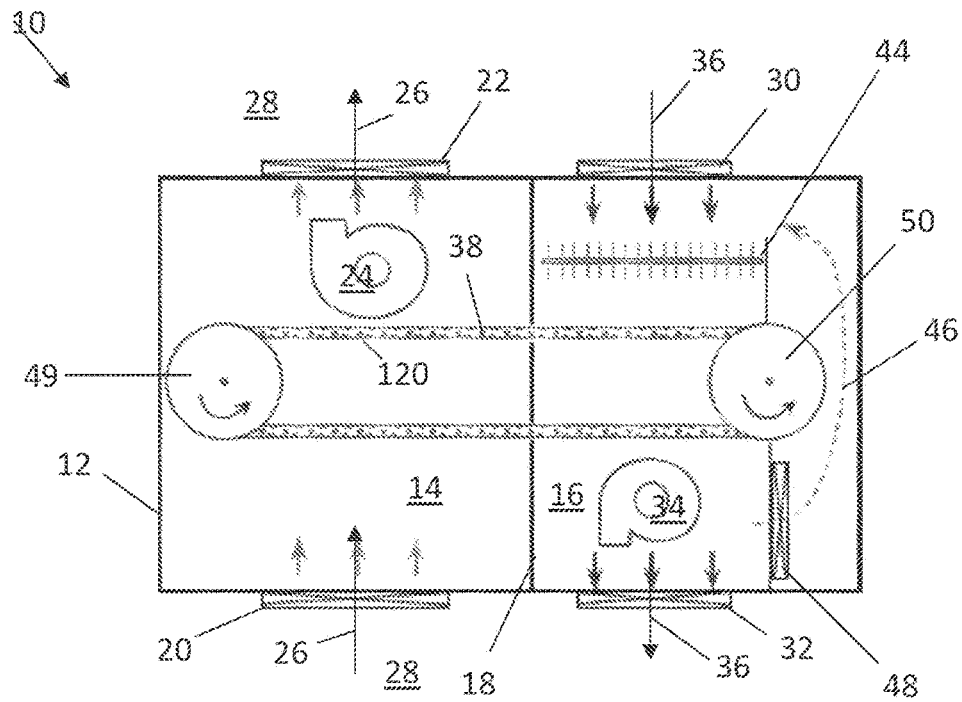
FIG. 3 is a schematic view of another embodiment of a $CO_2$ scrubber.
Figure 4:
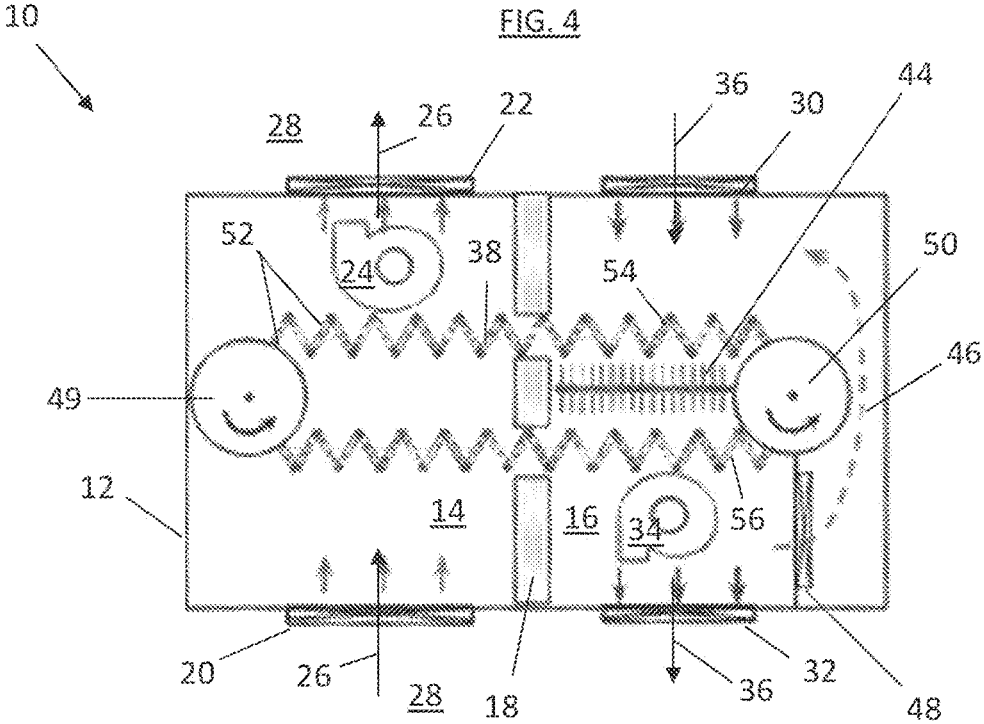
FIG. 4 is a schematic view of yet another embodiment of a $CO_2$ scrubber.

Another embodiment is illustrated in FIG. 3, in which the sorbent bed 38 has a belt configuration extending between a first drive wheel 49 located in the adsorption chamber 14 and a second drive wheel 50 located in the regeneration chamber 16. The sorbent bed 38 may include one or more sorbent materials disposed on a carrier 120. The carrier 120 may be a benign material configured to support the sorbent material without overly restricting airflow therethrough. For example, the carrier material 120 may be porous or pervious to airflow, such as a paper of cloth as is used in the construction of filters. The sorbent bed 38 may include one or more sorbent materials disposed onto a porous carrier material, such as an organic or polymeric thread or fiber or woven structure. At least one of the first drive wheel 49 and the second drive wheel 50 is powered to drive circulation of the sorbent bed 38 between the adsorption chamber 14 and the regeneration chamber 16. As shown in FIG. 3, the sorbent bed 38 may be a flat belt configuration, or a corrugated belt configuration such as shown in FIG. 4, having a plurality of corrugations 52. The plurality of corrugations 52 may be V-shaped, such as shown, or may have another shape such as U-shaped or curved-shape. In some embodiments, such as shown in FIG. 4, the heater 44 may be located between an upstream portion 54 and a downstream portion 56 of the sorbent bed 38.

Figure 5:
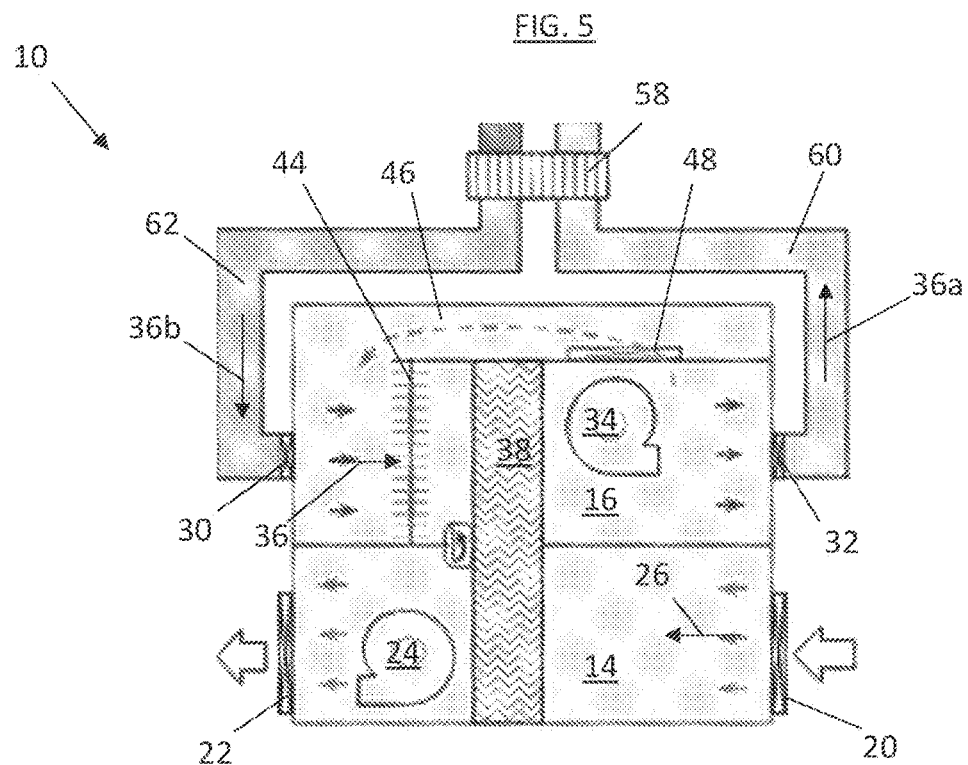
FIG. 5 is a schematic view of an embodiment of a $CO_2$ scrubber having thermal energy recovery.

Referring to FIG. 5, a heat recovery ventilation (HRV) heat exchanger 58 is utilized to recover thermal energy from an exhaust portion 36a of the regeneration airflow 36 at an exhaust duct 60 connected to the regeneration outlet damper 32 and transfer the recovered thermal energy to an inlet portion 36b of the regeneration airflow 36 at an inlet duct 62 connected to the regeneration inlet damper 30. In some embodiments, the HRV heat exchanger 58 is a plate type air to air heat exchanger, but one skilled in the art will readily appreciate that other types of heat exchangers may be utilized, such as a 2-phase thermosiphon or a gravity-based diode heat pipe may be utilized.

Figure 6:
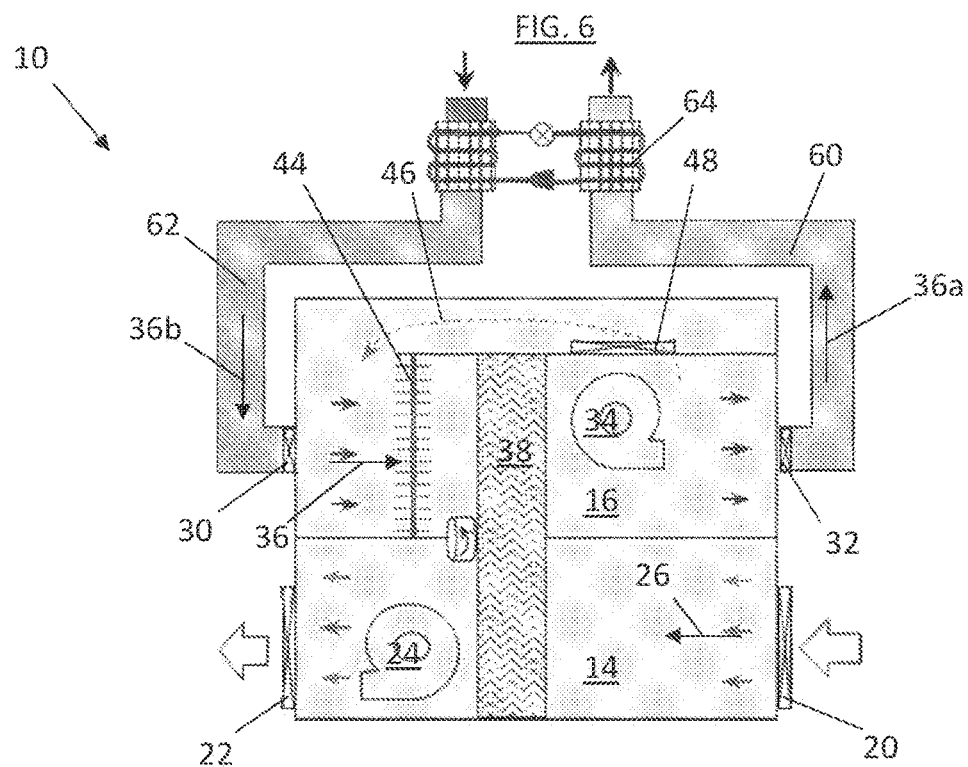
FIG. 6 is a schematic view of another embodiment of a $CO_2$ scrubber having thermal energy recovery.

In another embodiment, illustrated in FIG. 6, a direct expansion (DX) type heat pump 64 is located across the exhaust duct 60 and the inlet duct 62 to extract thermal energy from the exhaust portion 36a and transfer the thermal energy to the inlet portion 36b. Thermal energy recovery via the heat exchanger 58 or the heat pump 64 improves efficiency of the $CO_2$ scrubber 10 by reducing energy consumption of the heater 44 to raise the temperature of the regeneration airflow 36 to a desired temperature for regeneration of the sorbent bed 38.

In an embodiment illustrated in FIG. 7, the $CO_2$ scrubber 10 is used in conjunction with a heating, ventilation and air conditioning (HVAC) system 66, which is a terminal HVAC system, such as a fan coil unit with a thermal fluid circulated therethrough, or a DX system. Such an HVAC system 66 is at least partially located in the conditioned space 28, and conditions a return airflow 68 entering the HVAC system 66 from the conditioned space 28 and outputs a conditioned supply airflow 70 into the conditioned space 28. In some embodiments, a dedicated outdoor air system (DOAS) 72 provides a continuous flow of outside airflow into the conditioned space 28.

The $CO_2$ scrubber 10 is located in the conditioned space 28. In this embodiment, the adsorption airflow 26 is directed from the conditioned space 28 into the adsorption chamber 14 and returned to the conditioned space 28 after passing across the sorbent bed 38. The regeneration airflow 36 is not an outside airflow but is also airflow directed from the conditioned space 28 into the regeneration chamber 16. Once the regeneration airflow 36 passes across the sorbent bed 38, the regeneration airflow 36 is exhausted to ambient via the regeneration outlet damper 32. Such a configuration improves IAQ of the conditioned space 28 by removing $CO_2$ therefrom, and also reduces the airflow requirements of the DOAS 72. Alternatively, in another embodiment illustrated in FIG. 8, the regeneration airflow 36 is provided from the DOAS 72.

Figure 9:
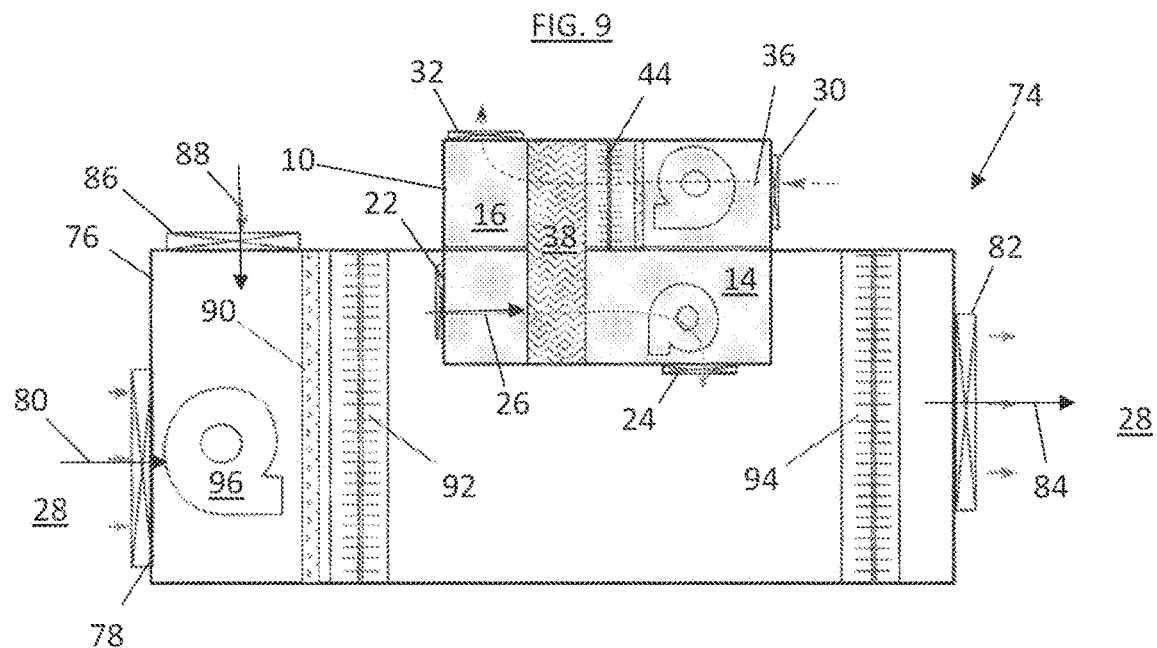
FIG. 9 is a schematic view of an embodiment of an air handling unit including a $CO_2$ scrubber.
Figure 10:
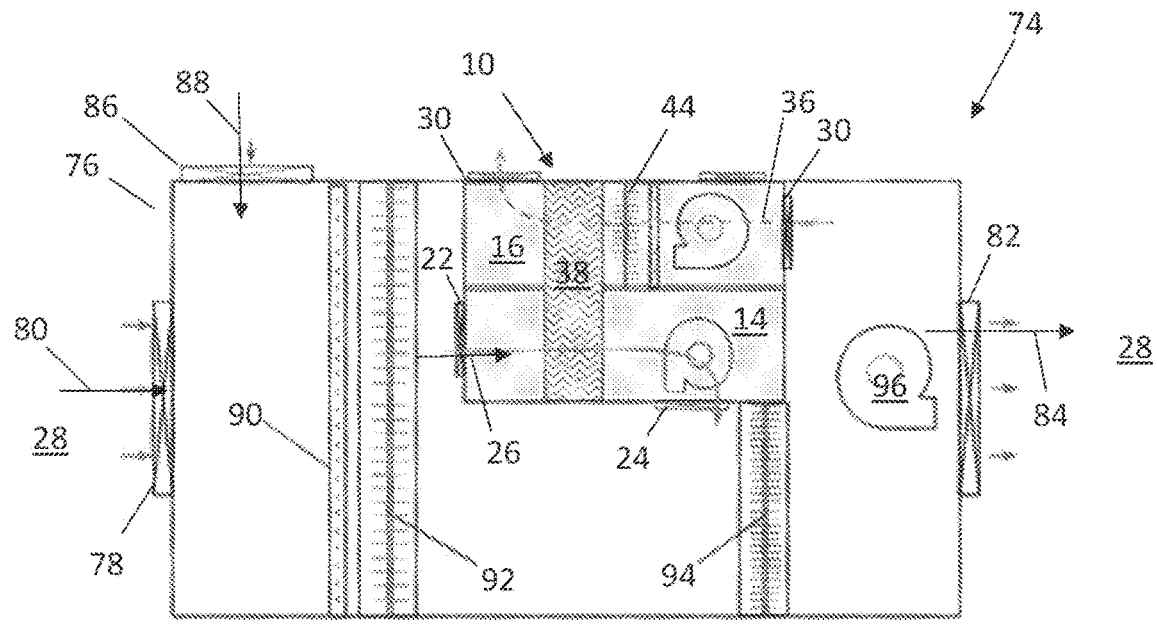
FIG. 10 is a schematic view of another embodiment of an air handling unit including a $CO_2$ scrubber.

Referring to FIGS. 9 and 10, the $CO_2$ scrubber 10 is incorporated into an air handling unit (AHU) 74. The AHU 74 includes an AHU housing 76 having a return air damper 78 through which a return airflow 80 is admitted to the AHU 74 from the conditioned space 28. A supply airflow damper 82 directs a supply airflow 84 from the AHU 74 into the conditioned space 28. Further, the AHU 74 may include an outside air damper 86 to admit an outside airflow 88 into the AHU 74. Further, the AHU 74 may include a filter 90, a cooling coil 92 to cool airflow in the AHU 74, and/or a heating coil 94 to heat airflow in the AHU 74. An AHU fan 96 may be disposed in the AHU housing 76 to urge airflow through the AHU 74. In the embodiment of FIG. 9, the $CO_2$ scrubber 10 is coupled to the AHU 74 such that the adsorption airflow 26 is directed from the AHU 74 into the adsorption chamber 14, and directed from the adsorption chamber 14 back into the AHU 74. The regeneration airflow 36 is directed from outside of the AHU 74 into the regeneration chamber 16 and from the regeneration chamber 16 to outside of the AHU 74. In this embodiment, outside of the AHU 74 may correspond to ambient. In some embodiments, the $CO_2$ scrubber 10 is positioned such that the adsorption airflow 26 is admitted into the adsorption chamber 14 downstream of the cooling coil 92 and is returned to the AHU 74 upstream of the heating coil 94.

Referring now to FIG. 10, in this embodiment, the regeneration inlet damper 30 is located in the AHU 74 such that the regeneration airflow 36 is admitted to the regeneration chamber 16 from the AHU 74 at a location, for example, downstream of the heating coil 94. After flowing across the sorbent bed 38, the regeneration airflow 36 is exhausted to ambient via the regeneration outlet damper 32.

Figure 11:
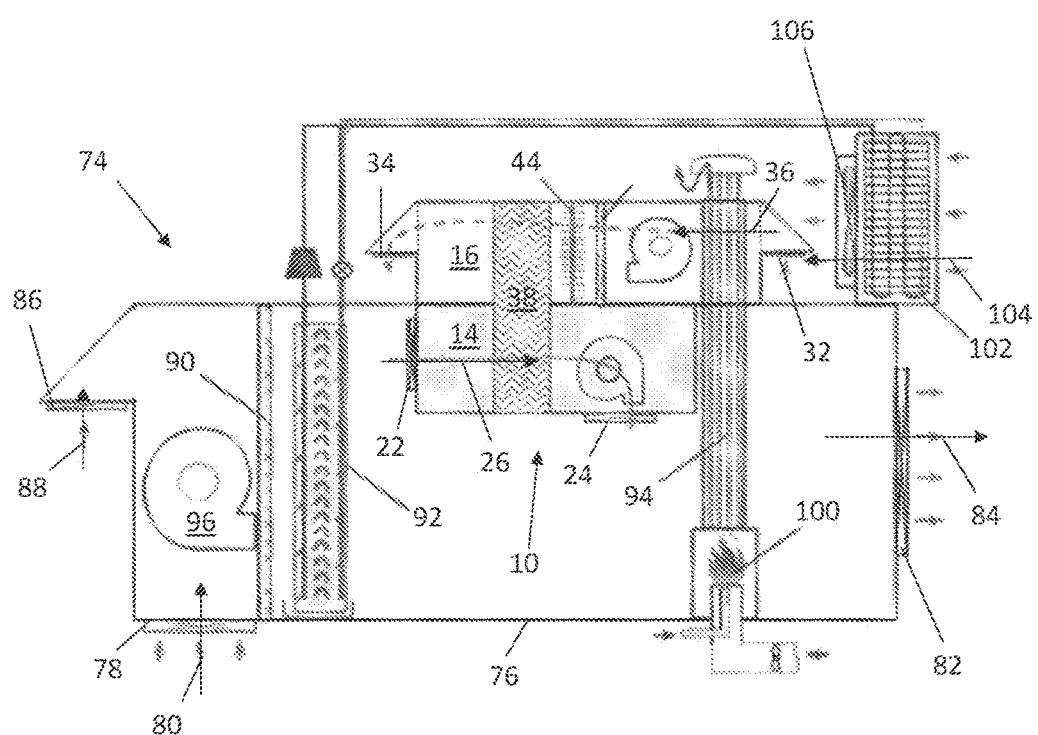
FIG. 11 is a schematic view of an embodiment of a roof top unit (RTU) including a $CO_2$ scrubber.

In another embodiment, such as shown in FIG. 11, the AHU 74 may be part of a rooftop HVAC system. In the rooftop HVAC system configuration, the heating coil 94 is an air-to-air heating coil 94 driven by a furnace 100, and the cooling coil 92 is an evaporator, which is part of a vapor compression cycle. The vapor compression cycle includes a condenser 102 located outside of the AHU housing 76. Condenser airflow 104 is driven across the condenser 102 by a condenser fan 106. The regeneration inlet damper 30 is located near the condenser 102, such that heated condenser airflow 104 is directed into the regeneration inlet damper 30. Further, the heating coil 94 may be configured to pass across the regeneration chamber 16. This configuration takes advantage of the heat of the condenser 102 during cooling seasons and/or the heating coil 94 during heating seasons to improve regeneration efficiency and reduce the amount of heat needed to be input via the heater 44 of the $CO_2$ scrubber 10.

Figure 12:
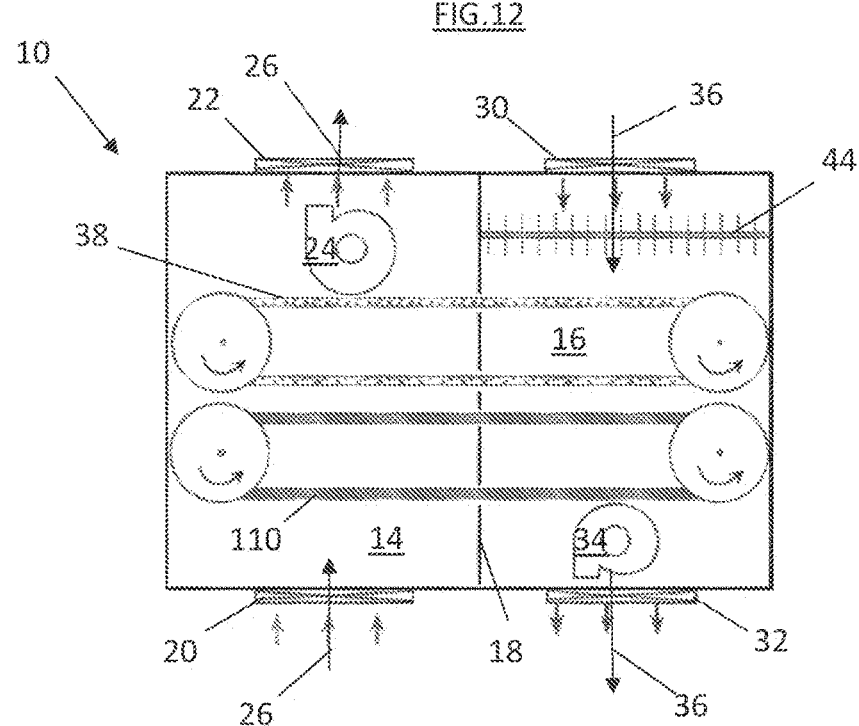
FIG. 12 is a schematic view of an embodiment of a $CO_2$ scrubber including an $H_2O$ sorbent bed.

Referring to FIG. 12, the $CO_2$ scrubber 10 includes a $CO_2$ sorbent bed 38 and a secondary sorbent bed 110, such as a desiccant to remove $H_2O$ from the adsorption airflow 26. In other embodiments, the secondary sorbent bed 110 may be configured to remove other gases, such as HCHO or volatile organic compounds (VOCs) from the adsorption airflow 26. Further, in some embodiments the secondary sorbent bed 110 and the $CO_2$ sorbent bed 38 may be disposed on a common carrier, in for example, alternating adjacent positions along the carrier. Both the $CO_2$ sorbent bed 38 and the desiccant could be regenerated through the hot air stream, thus synergy could be created. The secondary sorbent bed 110 may be a moving belt configuration extending across the adsorption chamber 14 and the regeneration chamber 16. $H_2O$ in the adsorption airflow 26 is adsorbed by the secondary sorbent bed 110 in the adsorption chamber 14 and the secondary sorbent bed 110 is regenerated at the regeneration chamber 16 by the regeneration airflow 36.

Figure 13:
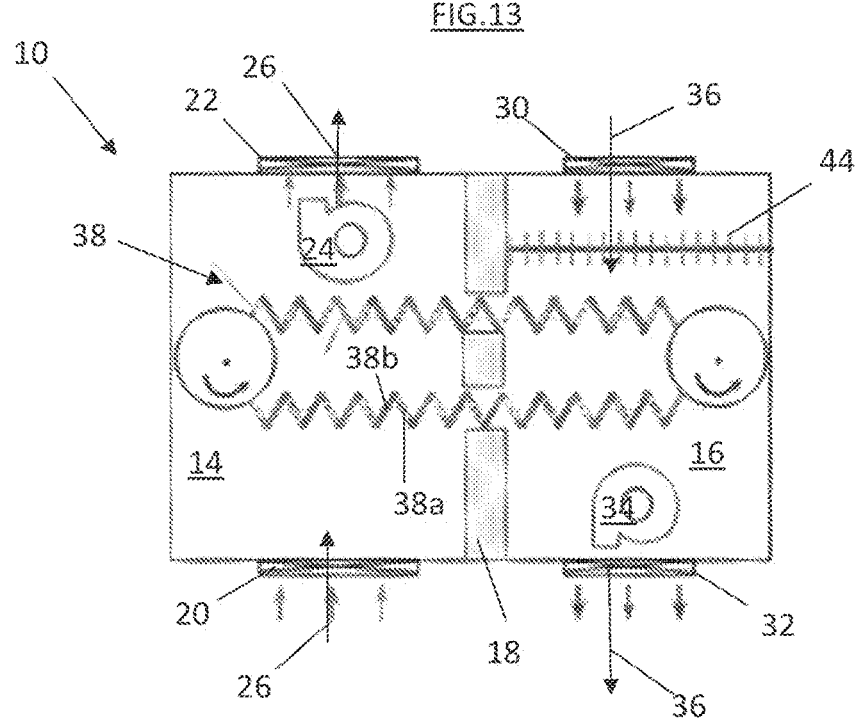
FIG. 13 is a schematic view of another embodiment of a $CO_2$ scrubber including an $H_2O$ sorbent bed.
Figure 14:
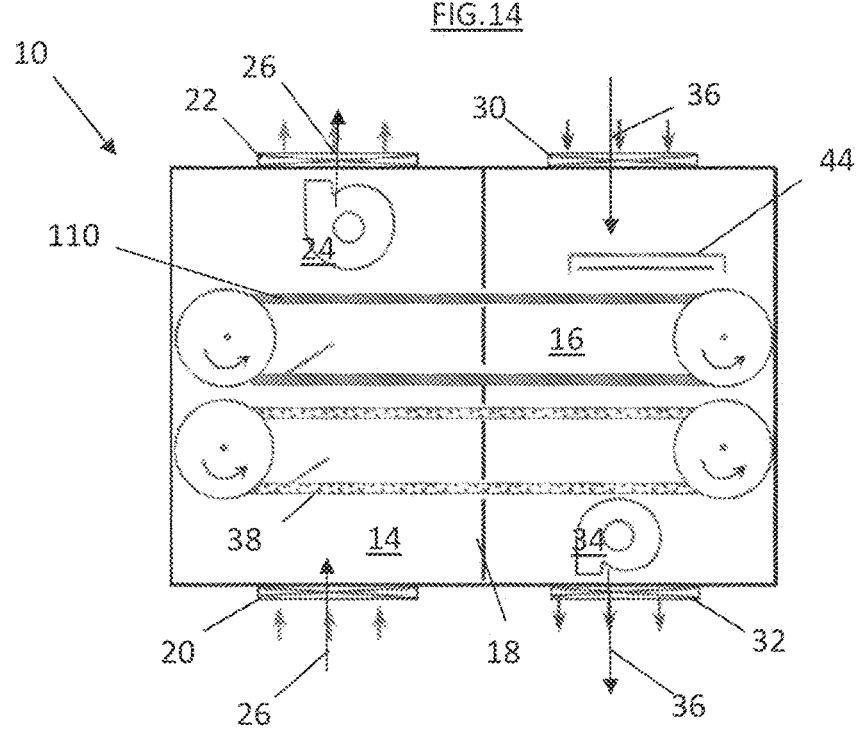
FIG. 14 is a schematic view of yet another embodiment of a $CO_2$ scrubber including an $H_2O$ sorbent bed.
Figure 15:
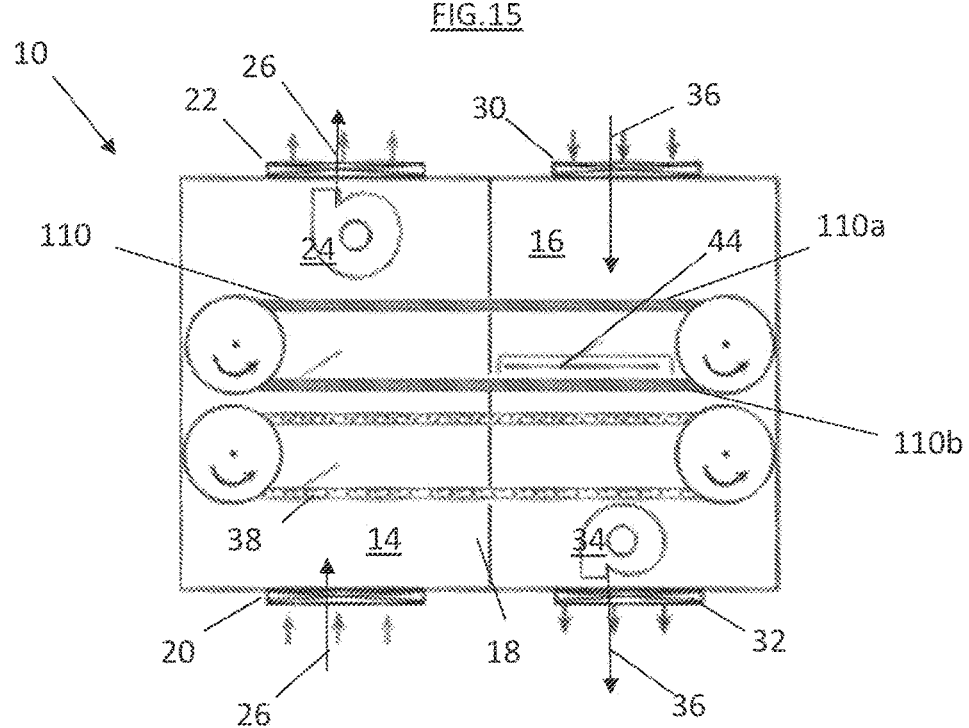
FIG. 15 is a schematic view of still another embodiment of a $CO_2$ scrubber including an $H_2O$ sorbent bed.

In another embodiment, shown in FIG. 13, the sorbent bed 38 is a corrugated belt configuration, in which a first leg 38a of a corrugation is a $CO_2$ sorbent material, while a second leg 38b is a desiccant material for $H_2O$ adsorption. Further, as shown in FIG. 12, the heater 44 may be located in the regeneration chamber 16 upstream of both the $CO_2$ sorbent bed 38 and the secondary sorbent bed 110. The heater 44, though, may be located to heat only a portion of the secondary sorbent bed 110, such as directly upstream of the secondary sorbent bed 110 such as in FIG. 14, or as shown in FIG. 15 between a first leg 110a of the secondary sorbent bed 110 and a second leg 110b of the secondary sorbent bed 110.

The configurations of $CO_2$ scrubbers 10 disclosed herein have the technical effect of being continuously operated, thus there is no separate regeneration mode in which the $CO_2$ is not being adsorbed. Because of continuous operation and regeneration, a smaller volume of sorbent material may be utilized in the sorbent bed 38. Further the $CO_2$ scrubber allows for reduction in the outside air volume flow volumes for ventilation and reduces the amount of potentially polluted outside air admitted into the conditioned space 28.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A carbon dioxide scrubber, comprising:
    a housing including:
        an adsorption chamber through which an adsorption airflow is directed;
        a regeneration chamber through which a regeneration airflow is directed;
        a divider wall separating the adsorption chamber from the regeneration chamber;
    a carbon dioxide sorbent bed configured extending across the adsorption chamber and the regeneration chamber, the carbon dioxide sorbent bed configured to adsorb carbon dioxide from the adsorption airflow into the sorbent bed and exhaust carbon dioxide from the carbon dioxide sorbent bed into the regeneration airflow;
    wherein the carbon dioxide sorbent bed is continuously movable through the adsorption chamber and the regeneration chamber; and
    a recirculation chamber defined in the housing and operably connected to the regeneration chamber by a recirculation damper, and configured to recirculate the regeneration airflow through the regeneration chamber;
    wherein the recirculation damper is disposed in a wall of the regeneration chamber dividing the regeneration chamber from the recirculation chamber.

2. The carbon dioxide scrubber of claim 1, further comprising a heater disposed in the regeneration chamber configured to heat the regeneration airflow.

3. The carbon dioxide scrubber of claim 1, wherein the carbon dioxide sorbent bed is a carbon dioxide sorbent wheel rotatable about a central axis.

4. The carbon dioxide scrubber of claim 1, wherein the carbon dioxide sorbent bed is a belt extending about a first drive wheel disposed in the adsorption chamber and a second drive wheel disposed in the regeneration chamber, the carbon dioxide sorbent bed circulated between the adsorption chamber and the regeneration chamber by rotation of the first drive wheel and the second drive wheel.

5. The carbon dioxide scrubber of claim 4, wherein the carbon dioxide sorbent bed is a corrugated belt.

6. The carbon dioxide scrubber of claim 1, wherein the carbon dioxide sorbent bed comprises one or more of activated carbon, carbon fiber, zeolite, molecular sieve, polymer fibers, metal organic framework (MOF), a metal oxide or amine or amine functionality containing material supported by at least one of silica, carbon, clay or metal oxide in granular or pelleted shape solids or fiber form.

7. The carbon dioxide scrubber of claim 1, further comprising a secondary sorbent bed spaced apart from the carbon dioxide sorbent bed, the secondary sorbent bed extending across the adsorption chamber and the regeneration chamber, the secondary sorbent bed configured to adsorb a secondary material from the adsorption airflow into the sorbent bed and exhaust the secondary material from the secondary sorbent bed into the regeneration airflow;
wherein the secondary sorbent bed is continuously movable through the adsorption chamber and the regeneration chamber.

8. The carbon dioxide scrubber of claim 7, wherein the secondary sorbent bed is a belt extending between the adsorption chamber and the regeneration chamber.

9. The carbon dioxide scrubber of claim 7, wherein the secondary sorbent bed is configured to adsorb one or more of H2O, HCHO or volatile organic compounds from the adsorption airflow.

10. The carbon dioxide scrubber of claim 7, wherein the secondary sorbent bed is independently movable through the adsorption chamber and the regeneration chamber relative to the carbon dioxide sorbent bed.

11. The carbon dioxide scrubber of claim 1, further comprising a heat exchanger configured to recover thermal energy from an exhaust portion of the regeneration airflow downstream of the regeneration chamber.

12. The carbon dioxide scrubber of claim 11, wherein the heat exchanger is configured to transfer the recovered thermal energy to an inlet portion of the regeneration airflow upstream of the regeneration chamber.

13. The carbon dioxide scrubber of claim 11, wherein the heat exchanger is one of a heat recovery ventilation heat exchanger or a direct expansion heat pump.

* * * * *